(12) United States Patent
Gagnon

(10) Patent No.: US 8,196,728 B2
(45) Date of Patent: Jun. 12, 2012

(54) ROLLER ASSEMBLY

(76) Inventor: Jean-Pierre Gagnon, Québec (CA)

(*) Notice: Subject to any disclaimer, the term of this patent is extended or adjusted under 35 U.S.C. 154(b) by 10 days.

(21) Appl. No.: 12/921,027

(22) PCT Filed: Mar. 5, 2008

(86) PCT No.: PCT/CA2008/000436
§ 371 (c)(1),
(2), (4) Date: Dec. 7, 2010

(87) PCT Pub. No.: WO2009/109030
PCT Pub. Date: Sep. 11, 2009

(65) Prior Publication Data
US 2011/0168520 A1 Jul. 14, 2011

(51) Int. Cl.
*B65G 13/00* (2006.01)
(52) U.S. Cl. .......................................... 193/37; 198/780
(58) Field of Classification Search .............. 193/35 R, 193/37; 198/780–792
See application file for complete search history.

(56) References Cited

U.S. PATENT DOCUMENTS

| | | | |
|---|---|---|---|
| 3,793,689 A * | 2/1974 | Specht | 193/37 |
| 4,139,203 A * | 2/1979 | Garrison | 277/348 |
| 4,312,444 A | 1/1982 | Mushovic | |
| 4,642,862 A * | 2/1987 | Muhle et al. | 492/53 |
| 5,238,166 A * | 8/1993 | Schwarstein et al. | 277/412 |
| 5,433,308 A | 7/1995 | Gagnon | |
| 6,059,095 A * | 5/2000 | Tsuji | 198/780 |
| 6,755,299 B2 | 6/2004 | Itoh et al. | |
| 6,814,213 B2 * | 11/2004 | Dyson et al. | 193/37 |
| 7,028,825 B2 | 4/2006 | Scott | |
| 2007/0181400 A1 | 8/2007 | Evans | |
| 2007/0261933 A1 | 11/2007 | Scott | |

FOREIGN PATENT DOCUMENTS

WO WO 2007/112553 A1 10/2007

* cited by examiner

*Primary Examiner* — James R Bidwell
(74) *Attorney, Agent, or Firm* — McDermott Will & Emery LLP

(57) ABSTRACT

A roller assembly is provided which includes a roller tube having outer and inner surfaces extending between ends, a pair of bearing assemblies mounted respectively at either end of the roller tube, locating assembly for axially locating the pair of bearing assemblies with respect to the roller tube, the bearing assemblies being distal from each other, and centering assembly for centering each of the bearing assemblies with respect to the roller tube. Each bearing assembly includes an axle, the axles of the bearing assemblies being independent from each other, first and second bearings positioned in a spaced apart relationship on the axle, and a casing enclosing the first and second bearings.

11 Claims, 5 Drawing Sheets

ROLLER ASSEMBLY

RELATED APPLICATION

This application is the U.S. National Phase under 35 U.S.C. §371 of International Application No. PCT/CA2008/000436, filed on Mar. 5, 2008, the disclosure of which Application is incorporated by reference herein.

FIELD OF THE INVENTION

The present invention relates to roller assemblies, and more specifically to roller assemblies for use in conveyors and the like.

BACKGROUND OF THE INVENTION

Conventional roller assemblies comprise a cylindrical tube which rotates with respect to a shaft by means of bearings.

U.S. Pat. No. 5,433,308 (Jean-Pierre Gagnon), issued Jul. 18, 1995 and titled "Roller Assembly and Method For Manufacturing the Same" and International patent application WO 2007/112553 (Jean-Pierre Gagnon), published Oct. 11, 2007 and titled "Cellular Encasement Protection System for Roller Assembly" both teach roller assemblies comprising an axle extending therethrough, a bearing at either extremity mounted to the axle, and a casing means for enclosing and sealing the bearings.

It would be advantageous to provide a roller assembly which is easier to manufacture, which can be made from a range of materials, which can be made form lighter materials and which is more reliable.

SUMMARY OF THE INVENTION

An aspect of the present invention is to provide a roller assembly which, by virtue of its design and components, satisfies at least some of the above-mentioned needs and is thus an improvement on other related devices known in the prior art.

In accordance with one aspect of the present invention, there is provided a roller assembly including a roller tube having outer and inner surfaces extending between ends, a pair of bearing assemblies mounted respectively at either end of the roller tube, locating means for axially locating the pair of bearing assemblies with respect to the roller tube, and centering means for centering each of the bearing assemblies with respect to the roller tube. Each bearing assembly includes an axle, first and second bearings positioned in a spaced apart relationship on the axle, and a casing enclosing the first and second bearings. The bearing assemblies are distal from each other. The axles of the bearing assemblies are independent from each other.

Preferably, the roller assembly further including an internal filling for occupying an area within the roller tube between the bearing assemblies.

Preferably, centering means includes an annular element positioned between the inner surface of the roller tube and a corresponding casing, and a plurality of annular segments positioned between the inner surface of the roller tube and the corresponding casing. The annular element is positioned at an extremity the corresponding casing that is proximate to the other casing, and the plurality of annular segments is positioned at an extremity of the corresponding casing that is distal to the other casing.

Preferably, for each bearing assembly the locating means includes a circumferential flange located on an outer surface of the casing, and a circumferential groove located on the outer surface of the casing. The circumferential groove is capable of cooperating with the circumferential flange.

Additional advantages and other features of the present invention will become more apparent upon reading of the following non-restrictive description of the preferred embodiments thereof, given for the purpose of exemplification only, with reference to the accompanying drawings.

DETAILED DESCRIPTION OF PREFERRED EMBODIMENTS

Figure 1:
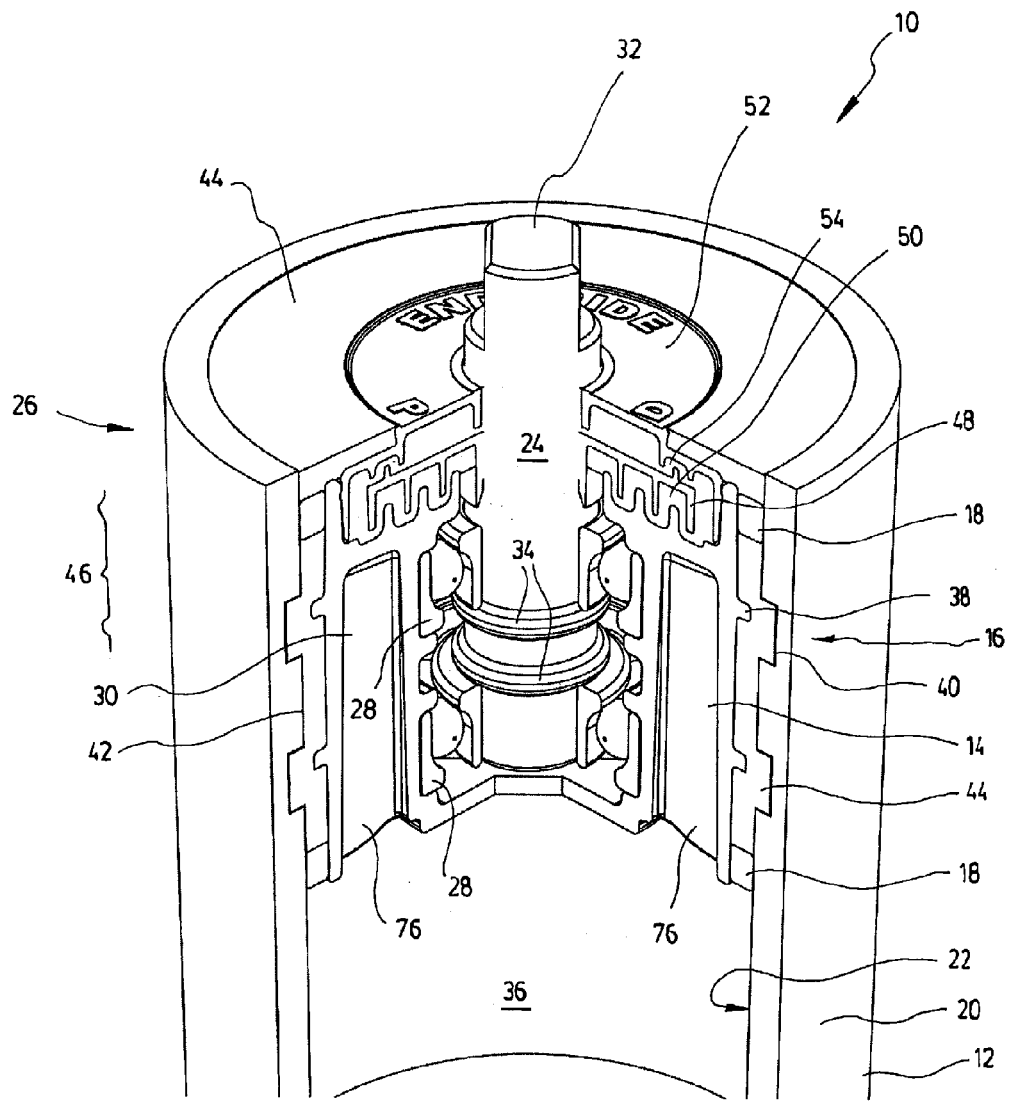
FIG. 1 is a partial cut-away view of a roller assembly according to a first embodiment of the present invention.

In the context of the present description, the expression "roller" includes different types of devices that can be used according to the present invention. Moreover, although the present invention was primarily designed for use in conveyors and the like, it will be appreciated that it could be used in other applications.

In the following description, similar features in the drawings have been given similar reference numerals and, for clarity, some elements are not referred to in some figures if they were already identified in a preceding figure.

With reference to FIG. 1, a roller assembly 10 in accordance with a first embodiment of the present invention comprises a roller tube 12, a bearing assembly 14, locating means 16 for axially locating the bearing assemblies 14 within the tube 12 and centering means 18 for centering the bearing assemblies 14 within the tube 12.

The roller tube 12 has an elongate tubular form comprising an outer surface 20 and an inner surface 22. The roller tube 12 may be provided in a variety of lengths and radial sizes. The roller tube 12 may be formed from a plastic material such as polyurethane, high density polyethylene (HDPE), polyvinyl chloride (PVC), or ultra high molecular weight plastic (UHMW). The roller tube 12 may also be formed from a metal such as steel, aluminum, or an alloy thereof. The roller tube 12 may further be formed by pultrusion, out of rubber, a ceramic composite, or any other appropriate material known in the art.

Typically, and in accordance with various industry standards and conventions, the roller tube 12 comprises an outer diameter ranging from of 2 to 7 inches, a length ranging from 4 inches to 7 feet, and a wall thickness ranging from 150 millimeters to 250 millimeters. It will be appreciated that roller tubes 12 having dimensions which fall outside of the afore-mentioned ranges are still within the scope of the present invention.

Two bearing assemblies 14 are located at both ends 26 of the roller tube 12. While only one bearing assembly 14 is shown for clarity, it will be appreciated that a second bearing assembly (not shown) is provided at an opposite end of the roller tube 12 such that the roller tube 12 is supported at either end 26 by a bearing assembly 14. As such, it will further be appreciated that the description of the illustrated bearing assembly 14 applies equally to both assemblies 14. With this in mind, the expressions "inner" and "outer" used in conjunction with an "extremity" of an element will hereinafter be used to designate relative positions in an axial direction along the length of the roller tube 12. For example, the "inner extremity" of a given bearing assembly 14 is that which is proximate, i.e. nearer, to the other bearing assembly 14, while the "outer extremity" is distal thereto. On the other hand, the expressions "inner" and "outer" used in conjunction with a "surface" of an element will to be used to designate relative positions in a radial direction, i.e. nearer or farther from the axis of the tube 12.

Each bearing assembly comprises an axle 24, first and second bearings 28 which are placed along the axle 24 in a spaced-apart relationship, and a casing 30 which encloses the bearings 28 while leaving an exposed outer extremity 32 of the axle 24 for mounting to a frame. While the bearings 28 illustrated are ball bearings, it will be appreciated that other types of bearings, such as needle, roller or tapered bearings could also be used as required. More broadly, the bearings 28 should not be considered limited to rolling-element bearings and may also include bushings, journal bearings or other sleeve-type bearings. In addition, bearings 28 of various sizes may be used. The specific size of the bearings 28 is generally proportional to the size of the roller tube 12. The bearings 28 will typically have an outer diameter ranging from 35 millimeters to 110 millimeters, although it will be appreciated that the bearings 28 according to the present invention should not be considered limited thereto.

The axle 24 further comprises a pair of ridges 34 which engage the inner race of each bearing 28 and, along with the inner surface of the casing 30, function to position of the bearings 28. It will be appreciated that the distance between the two bearings 28 will affect the stability and operation of the roller assembly 10. Advantageously, the precise positions of each bearing 28 along the axle 24 can be chosen in accordance with a specific usage or need by selecting a specific axle 24 and corresponding casing 30. Moreover, it will be appreciated that by doubly supporting the roller tube 12 on two short, independent axles 24 at each end 26 the roller assembly 10, the weight of the roller assembly 10 is significantly reduced compared to that of a conventional roller comprising a single, solid axle extending therethrough.

Preferably, the space between the bearing assemblies 14 is occupied by an internal filling 36. The filling 36 is preferably a material which is light and provides additional structural strength to the roller assembly 10, such as a polyurethane foam. The filling 36 is operable to prevent infiltration of moisture and increase the rigidity of the roller assembly 10. This is especially advantageous when the roller tube 12 is a light material such as HDPE, UHMW, polyurethane or PVC.

The locating means 16 comprises a circumferential flange 38 and a corresponding circumferential groove 40 which is capable of cooperating therewith in order to prevent movement of the bearing assembly 14 in an axial direction. Preferably, and as illustrated, first and second circumferential flanges 38 are provided extending outwardly from an outer surface 42 of the casing 30 and first and second circumferential grooves 40 are provided along the inner surface 22 of the roller tube 12. It will be appreciated however that a locating means wherein one or more circumferential flanges 38 are provided extending inwardly from the inner surface 22 of the tube 12 and one or more grooves 40 are provided in the outer surface 42 of the casing 30 is equally within the scope of the present invention.

Preferably, the flange 38 and the groove 40 do not engage one another directly, but rather do so indirectly through a hardened resin 44 which is poured into the tube 12 after the bearing assembly 14 has been positioned therein and subsequently hardened. The resin 44 may comprise any material which can be poured and then set, cured or otherwise hardened. Such materials include epoxy, polyurethane or other polymers, as well as rubber, various types of cement, concrete, or metals such as aluminum, steel or iron.

Alternatively, the casing is press-fit within the tube 12 and the flange 38 and groove 40 may be omitted altogether. In this case, the locating means 16, and possibly the centering means 18 as well, are carried out by the frictional engagement of the bearing assembly 14 and the roller tube 12.

The roller assembly 10 further comprises encasing means 46 which serves to retain a sealing means (not shown) within the assembly 10 and prevent transmission of particles into or out of the bearing assembly 14. The encasing means 46 may also be used to retain a lubricating means (also not shown) proximate the bearings 28. The encasing means 46 comprises a labyrinth 48 which cooperates with the outer face of the casing 30 to form a series of concentric channels 50 in which the sealing means may be enclosed and trapped. The encasing means 46 further comprises a sealing cap 52 which cooperates with the outer face of the labyrinth 48 to create another series of channels 54.

The labyrinth is fixed to the axle 24 while the sealing cap 52 is fixed to the casing 30 and therefore rotates with the roller tube 12. Preferably, the sealing cap 52 is enclosed by the hardened resin 44. The sealing means retained in the channels 50 and 54 is preferably, a composite sealant, and may also be a grease, a gel or some combination thereof.

Figure 2:
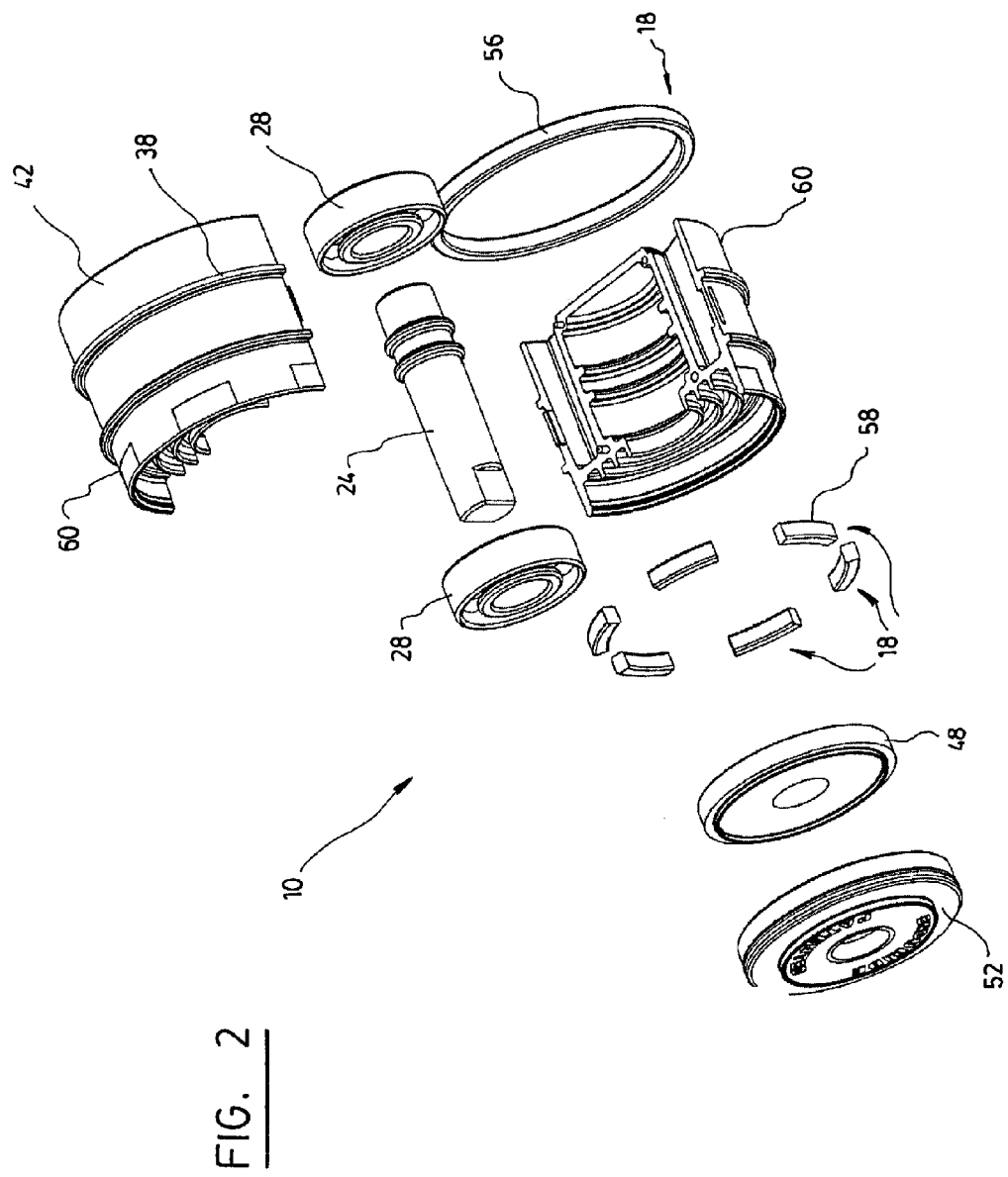
FIG. 2 is an exploded view of a part of the roller assembly of FIG. 1.

With additional reference now to FIG. 2, the centering means 18 comprises an annular element 56 and a plurality of annular segments 58. The annular element 56 is positioned between the inner surface 22 of the roller tube 12 and the outer surface 42 of the casing 30 proximate to the inner extremity of the bearing assembly 14. The plurality of annular segments 58 is also positioned between the roller tube 12 and the casing 30 but proximate the outer extremity of the bearing assembly 14.

As such, the fluid resin 44 may be poured around the bearing assembly 14 such that it flows through the gaps between the individual annular segments 58, filling up the space between the casing 30 and the tube 12. The fluid resin 44 is prevented from entering further within the tube 12 by the annular element 56, which seals against both the casing 30 and the inner surface 22 of the tube 12. The resin 44 is subsequently hardened, thereby locking the bearing assembly 14 in place and fixing the positions of the bearings 28 and the axle 24 with respect to the tube 12. The resin 44 not only fixes the bearing assemblies and encasing means, but also advantageously provides additional protection against contamination and vibrations which can be damaging to the roller assembly 10.

Figure 3:
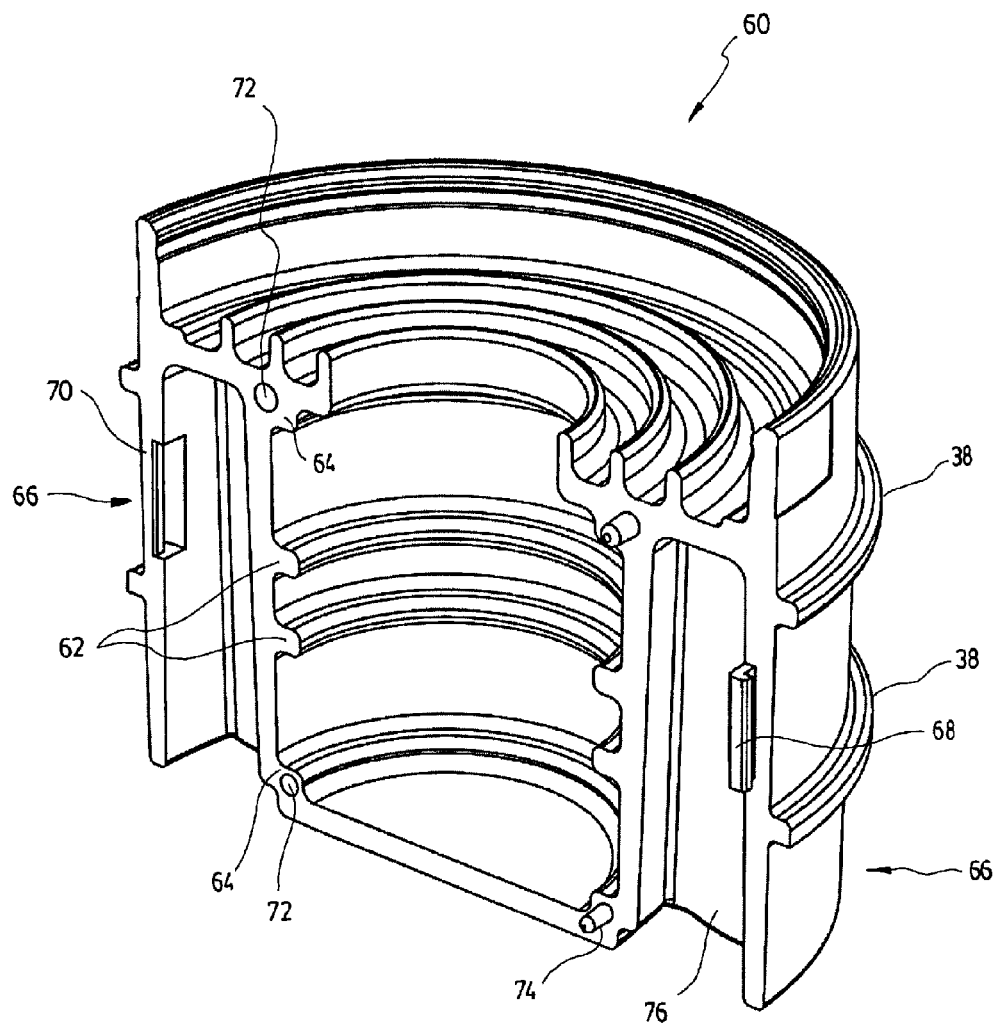
FIG. 3 is a perspective view of a casing portion of the roller assembly shown in FIGS. 1 and 2.

As illustrated in FIG. 2, and with additional reference now to FIG. 3, the casing 30 is preferably formed by combining first and second case portions 60. Each casing 30 has a cylindrical form comprising an axis. When assembled, the axis of the casing 30 coincides with the axis of the tube 12 such that the two elements are arranged concentrically. This cylindrical form comprises a plane of symmetry extending in a longitudinal direction. Preferably, the case portions 60 each form a half of the cylindrical form divided by the plane such that each case portion 60 has a semi-circular cross-section when taken along a plane perpendicular to the axis of the casing 30.

The circumferential flanges 38 extend around the exterior of the portion 60, although it will be appreciated that a circumferential flange 38 arranged segmentally around the exterior of the portion, i.e. a circumferentially flange 38 comprising a plurality of circumferential segments rather than one continuous element, is within the scope of the present invention.

The portion 60 further comprises a pair of internal flanges 62 and abutments 64 which extend inwardly from its inner surface which work in conjunction with the ridges 34 to position of the bearings 28.

During assembly, the bearings 28 are positioned on the axle 24 and sandwiched between the portions 60. A set of attachments 66 are provided for attaching together the two portions 60. The attachments 66 comprise a hook portion 68 and a receiving portion 70 which are provided on opposing sides of the portion 60. When combined, the hook portion 68 of a first portion 60 clasps the receiving portion 70 of a second portion 60, while the hook portion 68 of the second clasps the receiving portion 70 of the first.

The attachments 66 further comprise a pair of pins 72 and complementary sockets 74 for securing the case portions 60 with respect to one another. Here again, the pins 72 of a first portion 60 are received within the sockets 74 of a second portion 60 and vice versa. It will be appreciated that more or less pins 72 and sockets 74 could similarly be provided.

The portion 60 comprises a plurality of webs 76 which span the area between the inner and outer surfaces of the casing 30. The webs 76 extend radially and longitudinally and are distributed evenly around the casing 30 so as to strengthen it.

The case portions 60 are preferably injection molded or cast from a plastic, resin, metal material. Advantageously, both portions 60 may then be formed from the same mould. However, it will be appreciated that case portions 60 in accordance with the present invention could also be manufactured by other means. For example, the portions 60 could be machined from a solid material.

Figure 4:
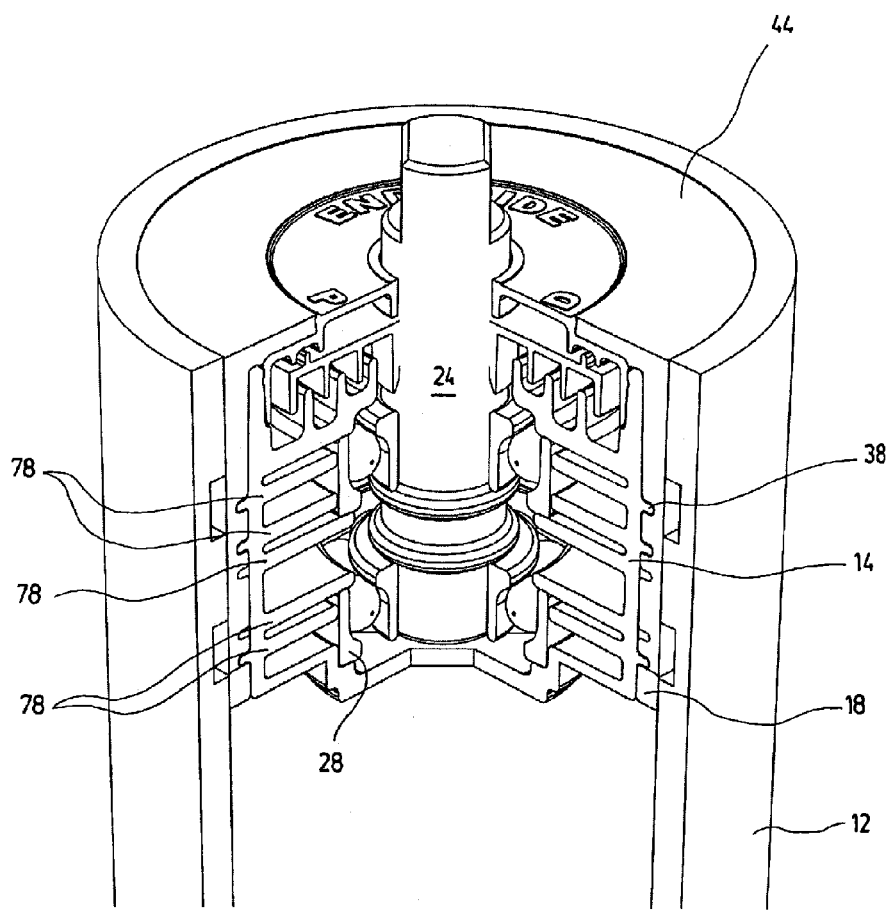
FIG. 4 is a partial cut-away view of a roller assembly according to a second embodiment of the present invention.
Figure 5:
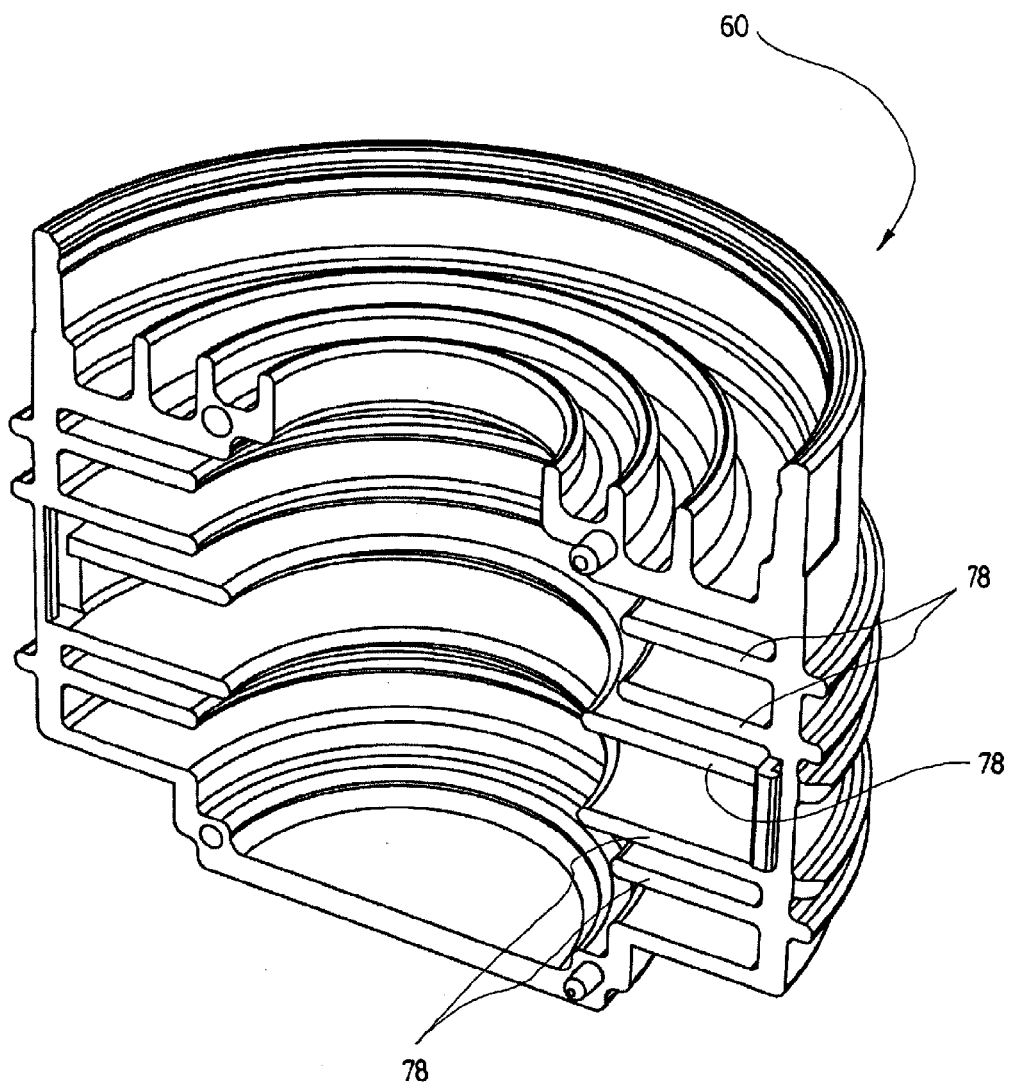
FIG. 5 is a perspective view of a casing portion of the roller assembly shown in FIG. 4.

With reference to FIGS. 4 and 5, a second embodiment of the bearing assembly 14 is illustrated. Specifically, an alternate case portion 60 is provided wherein the webs 76 (shown in FIG. 1) are substantially replaced by a plurality of inwardly extending ribs 78. The ribs extend radially and laterally and the ends of the ribs 78 combine to form the inner surface of the casing 30 and the flanges 62 which previously located the bearings 28.

Although the present invention has been explained hereinabove by way of preferred embodiments thereof, it should be pointed out that any modifications to these preferred embodiments within the scope of the appended claims are not deemed to alter or change the nature and scope of the present invention.

The invention claimed is:

1. A roller assembly comprising:
   a) a roller tube having outer and inner surfaces extending between ends;
   b) a pair of bearing assemblies mounted respectively at either end of the roller tube, each bearing assembly comprising:
      i) an axle, the axles of the bearing assemblies being independent from each other;
      ii) first and second bearings positioned in a spaced apart relationship on the axle; and
      iii) a casing enclosing the first and second bearings;
   c) locating means for axially locating the pair of bearing assemblies with respect to the roller tube, the bearing assemblies being distal from each other;
   d) centering means for centering each of the bearing assemblies with respect to the roller tube, the centering means comprising:
      i) an annular element positioned between the inner surface of the roller tube and a corresponding casing, the annular element being positioned at an extremity the corresponding casing that is proximate to the other casing; and
      ii) a plurality of annular segments positioned between the inner surface of the roller tube and the corresponding casing, the plurality of annular segments being positioned at an extremity of the corresponding casing that is distal to the other casing; and
   e) a hardened resin for encasing the ends of the roller tube and the casings therebetween, the annular element preventing the resin from entering an area between the bearing assemblies.

2. The roller assembly of claim 1, further comprising an internal filling for occupying an area within the roller tube between the bearing assemblies.

3. The roller assembly of claim 2, wherein the internal filling is a polyurethane foam.

4. The roller assembly of claim 1, wherein for each bearing assembly the locating means comprises:
   f) a circumferential flange located on an outer surface of the casing, and
   g) a circumferential groove located on the inner surface of the roller tube, the circumferential groove being capable of cooperating with the circumferential flange.

5. The roller assembly of claim 4, wherein each circumferential groove engages respectively with the corresponding circumferential flange indirectly through a hardened polymer resin.

6. The roller assembly of claim 1, further comprising an encasing assembly for retaining a sealing means, wherein for each bearing assembly the encasing assembly comprises a sealing cap positioned proximate an outer extremity of the casing and a labyrinth positioned between the sealing cap and the casing.

7. The roller assembly of claim 1, wherein the casings each comprises first and second case portions provided with attachments for attaching together the first and second case portions.

8. The roller assembly of claim 7, wherein each casing has a cylindrical form comprising a plane of symmetry extending along a longitudinal direction of the casing and the first and second portions form halves of the cylindrical form divided by the plane of symmetry.

9. The roller assembly of claim 8, wherein the attachments comprise cooperating hook and receiving portions for attaching together the first and second case portions.

10. The roller assembly of claim 9, wherein the attachments further comprise a pin and a complementary socket for positioning the case portions with respect to one another.

11. The roller assembly of any one of claims 1 to 3, wherein the roller tube is made from a plastic material.

* * * * *